April 1, 1930.  F. J. SPANG  1,752,656
FISHING TOOL
Filed Oct. 2, 1928

Fig.1.
Fig.2.
Fig.3.
Fig.4.

INVENTOR
F. J. Spang.
by W. G. Doolittle
Attorney.

Patented Apr. 1, 1930

1,752,656

UNITED STATES PATENT OFFICE

FERDINAND J. SPANG, OF BUTLER, PENNSYLVANIA

FISHING TOOL

Application filed October 2, 1928. Serial No. 309,825.

My invention relates to improvements in fishing tools, employed in well drilling operations, and more particularly to a fishing tool of the internal gripping type.

Heretofore, it has been customary to form the drilling tools and the like with the threaded pin portion of a pin-and-box joint projecting upward. Recent practice has prescribed the use of the box portion of such a joint on the drilling tools projecting upward. Consequently, when such a tool is lost, the ordinary fishing tool of the external gripping type is unable to effect a gripping engagement and a withdrawal of the lost tool, because of the lack of space between the box member and the casing or the wall of the well.

It is a prime object of my invention to provide a new and improved fishing tool adapted to be inserted into the threaded box connection of a lost drilling tool or the like to effect a gripping contact therewith to permit removal of the lost article from the well.

A further object of the present invention is to provide a new and improved fishing tool construction embodying means functioning to effect a secure gripping of the lost article by a jarring operation or action.

Other objects and advantages will be specifically pointed out or become apparent from a consideration of the following description taken in connection with the accompanying drawings, wherein:

Fig. 1 is a vertical sectional view of a fishing tool embodying my invention, showing the tool entering the box portion of a joint of a lost drilling tool;

Fig. 2, a view similar to Fig. 1, showing the parts of the tool in gripping engagement with the lost tool;

Fig. 3, a cross sectional view taken on the line III—III of Fig. 1; and

Fig. 4, an enlarged fragmentary view, showing the locking means for maintaining the tool in gripping engagement.

Referring to the drawings, and as preferred, the fishing tool embodying my invention includes a body 2, in threaded engagement with a striking head 3. The striking head has formed integral therewith a wrench portion 4 and a threaded extension 5 adapted for engagement with a fishing string, not shown, employed for the manipulation of the tool. The body 2 is formed with a central bore 6 extending longitudinally thereof and for the greatest portion of its length, a reduced bore 7 at its lower end, and with an annular shoulder 8. The upper end of the body is internally threaded to receive the threaded end portion of the striking head 3.

Disposed partly within the hollow body 2 and designed to cooperate therewith, I provide an article-gripping member, generally designated by the numeral 9. This member, as illustrated, includes a head portion 10 of substantially the same diameter as the bore 6, a shoulder 11, and a reduced body or shank portion 12. At its lower end, member 9 is formed with a tapered threaded and expansible portion 13 having threads adapted for engagement with the threaded box connection 14 of a drilling tool A. Member 9 is further provided with a longitudinally extending bore 15 terminating in a tapered bore 16 at its lower end. For a portion of its length, body 12 is formed with a plurality of slots 17 to provide the yielding or expansible gripping portion.

Positioned in the bore 15 is a wedging or expanding member 18 having a head 19, an anvil or contact portion 20, and a tapered wedge portion 21, the latter being of substantially the same taper as the bore 16 of the expansible portion. Said member 18 is also provided intermediate of its ends with a ratchet 22 designed to cooperate with a spring-pressed locking pawl or dog 23 carried in member 9.

Threaded shear pins 24, for locking the body 2 against movement relatively to the member 9 during the operation of lowering the tool into the well, are mounted in the body 2 and project inwardly into recesses 25 in the head 10 of member 9.

In operation, the tool is lowered into the well until the threaded portion 13 comes into contact with the threaded box of the "fish," or the lost article. The shearing of the pins 24 is sufficient to allow for penetration through mud and foreign matter which may have collected over the top of the lost tool A.

After entrance of the portion 13 into the said box has been made in the manner shown by Fig. 1, a jarring operation or action is applied to the tool. This jarring action will shear the pins 24 and cause the head 3 of body 2 to strike upon anvil 20 of expanding member 18, actuating said member and forcing the wedge portion 21 thereof into the tapered bore 16 of the expansible portion of the gripping member 9. Due to the resiliency provided by the slots 17, the threaded portion 13 will be expanded into gripping engagement with the threads of box member 14. The movement of wedging member 18 will bring ratchet 22 into register with locking dogs 23, as shown in Fig. 2, and the said co-acting locking means will maintain the member 18 in wedging position.

Upon elevating the body 2 on the gripping member 9 from the position shown by Fig. 2 to the position shown by Fig. 1, the shoulder 8 will contact with shoulder 11, thereby positioning the parts so that the tool, together with the engaged "fish" or article, may be withdrawn from the well by raising the string in the usual manner.

After the withdrawal of the tool and its engaged article from the well the article may be released from the fishing tool by first removing the head 3 from the body 2, and the screw-plug 27 for retaining the spring-pressed dog 23; after which, the wedging or expanding member 18 may be partly withdrawn from the gripping member 9 by the employment of and the manipulation of screws or threaded members, not shown, entered in threaded vertically extending openings 26 formed in the head 19 of the member 18. This partial withdrawal of member 18 is sufficient to raise the wedging portion 21 from the position shown in Fig. 2 to that of Fig. 1, thus freeing the fishing tool from the recovered article.

I claim:

1. In a fishing tool, the combination with a hollow body, of an elongated bored expansible gripping member having a portion entered in and cooperating with the body, and an expanding member disposed in the gripping member and positioned for actuation by a movement of the body.

2. In a fishing tool, the combination with a hollow body, of an elongated hollow expansible gripping member having a portion entered in and cooperating with the body, and an expanding member disposed in the gripping member and positioned for actuation by a movement of the body, said body having a striking member adapted to contact with the expanding member.

3. In a fishing tool, the combination with a hollow body, of an expansible gripping member having a portion entered in and cooperating with the body, and a tapered threaded article-engaging portion at an end thereof, and an expanding member associated with the gripping member and positioned for actuation by a movement of the body member.

4. In a fishing tool, the combination with a hollow body, of an expansible gripping member having a portion entered in and cooperating with the body, and a tapered threaded article-engaging portion at an end thereof, and an expanding member associated with the gripping member and positioned for actuation by a movement of the body member, said body having a striking member, and said expanding member having a head at one end thereof for co-action with the striking member.

5. In a fishing tool, the combination of a hollow body, of an expansible hollow gripping member having a portion entered in and cooperating with the body and formed with a tapered end portion, an expanding member disposed in the gripping member, said gripping member and expanding member having co-acting locking means, said expanding member positioned for actuation by a movement of the body member.

6. In a fishing tool, the combination of a hollow body, of an expansible hollow gripping member having a portion entered in and cooperating with the body and formed with a tapered end portion, an expanding member disposed in the gripping member, said gripping member and expanding member having co-acting locking means, said expanding member positioned for actuation by a movement of the body member, said body having a striking member, and said expanding member having a head at one end thereof for co-action with the striking member upon movement of the body on the gripping member.

In testimony whereof I affix my signature.

FERDINAND J. SPANG.